(12) United States Patent
Skidmore

(10) Patent No.: US 9,836,888 B2
(45) Date of Patent: Dec. 5, 2017

(54) SYSTEMS AND METHODS FOR AUGMENTED REALITY REPRESENTATIONS OF NETWORKS

(71) Applicant: EDX Technologies, Inc., Austin, TX (US)

(72) Inventor: Roger Ray Skidmore, Austin, TX (US)

(73) Assignee: EDX Technologies, Inc., Austin, TX (US)

(*) Notice: Subject to any disclaimer, the term of this patent is extended or adjusted under 35 U.S.C. 154(b) by 0 days.

(21) Appl. No.: 15/436,154

(22) Filed: Feb. 17, 2017

(65) Prior Publication Data

US 2017/0243400 A1 Aug. 24, 2017

Related U.S. Application Data

(60) Provisional application No. 62/296,734, filed on Feb. 18, 2016, provisional application No. 62/362,949, filed on Jul. 15, 2016.

(51) Int. Cl.
| | |
|---|---|
| *G09G 5/00* | (2006.01) |
| *G06T 19/00* | (2011.01) |
| *G06F 3/0346* | (2013.01) |
| *G06T 9/00* | (2006.01) |
| *G02B 27/01* | (2006.01) |

(52) U.S. Cl.
CPC ........ *G06T 19/006* (2013.01); *G02B 27/0172* (2013.01); *G06F 3/0346* (2013.01); *G06T 9/002* (2013.01); *G02B 2027/014* (2013.01); *G02B 2027/0141* (2013.01)

(58) Field of Classification Search
None
See application file for complete search history.

(56) References Cited

U.S. PATENT DOCUMENTS

| | | | |
|---|---|---|---|
| 7,246,045 B1 | 7/2007 | Rappaport et al. | |
| 9,576,214 B1* | 2/2017 | Zhang | G06K 9/4614 |
| 2003/0117402 A1 | 6/2003 | Hubrecht et al. | |
| 2005/0024388 A1* | 2/2005 | Takemoto | G06T 19/006 345/633 |
| 2007/0242131 A1* | 10/2007 | Sanz-Pastor | H04L 12/5865 348/14.02 |
| 2010/0091018 A1* | 4/2010 | Tatarchuk | G06T 13/20 345/423 |
| 2012/0147041 A1* | 6/2012 | Jang | H04N 1/00315 345/633 |
| 2012/0249588 A1* | 10/2012 | Tison | G06F 1/1696 345/633 |
| 2013/0095924 A1 | 4/2013 | Geisner et al. | |

(Continued)

FOREIGN PATENT DOCUMENTS

| | | |
|---|---|---|
| CN | 101349746 A | 1/2009 |
| CN | 104501798 A | 4/2015 |
| WO | 2014193342 | 12/2014 |

*Primary Examiner* — Anh-Tuan V Nguyen
(74) *Attorney, Agent, or Firm* — Whitham, Curtis & Cook, P.C.

(57) ABSTRACT

Augmented reality systems and methods are disclosed which provide for representing imperceptible aspects of telecommunications networks as visual, auditory, tactile, or audiovisual stimuli. In some embodiments, the representation is a type of augmented reality from the perspective of a user on the ground, such as a technician deployed in the field.

29 Claims, 9 Drawing Sheets

(56) References Cited

U.S. PATENT DOCUMENTS

| | | |
|---|---|---|
| 2013/0339864 A1 | 12/2013 | Uusitalo et al. |
| 2014/0055490 A1 | 2/2014 | Mul et al. |
| 2014/0089810 A1* | 3/2014 | Chen ................... G06F 1/1686 715/738 |
| 2015/0009232 A1* | 1/2015 | Lauder ................. G06F 1/1694 345/632 |
| 2015/0029220 A1* | 1/2015 | Hittel ..................... H04W 4/02 345/633 |
| 2015/0130836 A1 | 5/2015 | Anderson |
| 2015/0332505 A1* | 11/2015 | Wang ................... G06T 19/006 345/633 |
| 2016/0034788 A1* | 2/2016 | Lin ....................... G06K 9/627 382/157 |
| 2016/0035078 A1 | 2/2016 | Lin et al. |
| 2016/0210783 A1* | 7/2016 | Tomlin ................. G06T 19/006 |
| 2016/0247290 A1* | 8/2016 | Liu ...................... G06K 9/4604 |
| 2016/0260256 A1* | 9/2016 | Shefi ..................... G06T 19/20 |
| 2017/0076504 A1* | 3/2017 | Oar ....................... G06T 19/006 |

\* cited by examiner

SYSTEMS AND METHODS FOR AUGMENTED REALITY REPRESENTATIONS OF NETWORKS

CROSS-REFERENCE TO RELATED APPLICATIONS

This application claims the benefit of U.S. Provisional Patent App. No. 62/296,734, filed Feb. 18, 2016, and U.S. Provisional Patent App. No. 62/362,949, filed Jul. 15, 2016. The complete contents of both provisional patent applications are incorporated herein by reference.

FIELD OF THE INVENTION

The present invention generally relates to representations of telecommunication networks and, in some embodiments, methods and devices for augmented reality.

BACKGROUND

U.S. Patent App. Pub. No. 2014/0055490 A1 describes an augmented reality interface with which a consumer can visualize wireless signal strength or service coverage information for his or her mobile device in the user's vicinity. The technique examines a ring of space around the user for service coverage and divides the ring into arcs characterized by different service coverage strengths. Blocks of color are superimposed on an image of the user's surroundings displayed on the user's mobile device, where different blocks of color indicate to the user in which direction(s) better service coverage exists and in what direction(s) poorer service coverage exists.

U.S. Pat. No. 7,246,045 B1 describes a method that gives a visual of performance of wireless communications systems via a three-dimensional region of fluctuating elevation, color, or other aesthetic characteristics that is overlaid with a three-dimensional site-specific computer model. Both the colored region and the computer model are virtual and intended for design engineers in the planning stage of a wireless network working off site from the specific site where the wireless network may be deployed.

U.S. Patent App. Pub. No. 2013/0339864 A1 describes connectivity assistance with information sources through a mixed-reality environment. Symbols representative of connectivity options are place on an image of the real environment. For example, a WiFi symbol may be placed over a café offering free WiFi.

SUMMARY

According to an aspect of the invention, means are provided for perceptibly representing networks or aspects of networks, including visual, audial, tactile, or audiovisual representations of network performance data and asset configurations.

An exemplary computer-implemented method for augmented reality includes the following steps: using a plurality of sensors to collect first data concerning a position and orientation of a viewing device arranged to allow a real world view of a geographic space as viewed by a user situated in the geographic space; determining, using one or more processors, a real world frustum based on the first data; applying, with the one or more processors, the real world frustum to a virtual world to identify virtual object candidates for augmentation, wherein the virtual world includes one or more virtual objects that describe one or more qualities of one or more of network performance and asset configuration that are imperceptible in the real world view; selecting, with the one or more processors, one or more augmentations corresponding with one or more of the virtual object candidates including at least one virtual object that describes one or more qualities of one or more of network performance and asset configuration that are imperceptible in the real world view; and providing, with an output device, at least one selected augmentation concurrently with the real world view, the at least one selected augmentation making perceptible one or more qualities of one or more of network performance and asset configuration that are imperceptible in the real world view.

As an illustration of the preceding paragraph, an exemplary embodiment involves a person standing or walking around in the real world and looking about with the aid of device such as a head-mounted display (HMD) or a smartphone. The device has sensors and possibly a camera, and it collects data concerning where the person is situated and in what direction the person is looking. This data collected by the sensors and camera is processed to determine what lies ahead of the person's gaze, perceived or unperceived, seen or unseen. Having determined the field of view (frustum) and pose (location and orientation) of the user, the system uses a virtual representation of that physical environment to select virtual objects and corresponding virtual augmentations, such as shapes or cartoons, which are displayed to the user on the HMD or the smartphone. These augmentations allow the user to see, hear, or feel otherwise imperceptible qualities of telecommunication technology and networks around them, such as wireless signal strength in different spots, the path of a radio transmission between a transmitter and a receiver, or the location of a specific router among many routers having identical exteriors.

Some embodiments are especially directed to the needs of technicians and other personnel of telecommunications companies when working in the field (e.g., outside or inside where the company is responsible for a wired and/or wireless network). The needs of a technician differ considerably from those of, for example, a general consumer. For instance, a general consumer's interest in telecommunications networks is limited to his or her personal device(s). If trying to connect to a WiFi connection, the consumer is only interested in the existence and signal strength of WiFi connections that are public or to which the consumer has a security key. If trying to connect to a mobile network (e.g., a Verizon® 4G LTE network), then the consumer is only concerned with the signal strength experienced by his or her personal mobile phone or tablet that is being connected to the mobile network. Moreover, hardware considerations are essentially immaterial to a consumer. For example, a consumer desiring to connect his or her device to a WiFi connection is not concerned with the physical location of a coffee shop's router; the consumer is interested only in the hotspot generated by the router, such as the entire interior of the coffee shop, or just a particular portion of the coffee shop. A technician, on the other hand, has an interest if not the requirement to locate the router and understand the relationship between the router and its environment. This relationship includes the network performance in the environment of the physical hardware.

According to an aspect of the invention, one or more output devices are used to provide augmentation of a real world view of a geographic space. For example, according to some embodiments, an output device includes a display apparatus that shows an augmented image that is a combination of an image of a real world view of a geographic space together with one or more augmentations of unseen qualities of one or more of network performance and asset configuration for the geographic space. Alternatively or in addition to visual augmentations, audial or tactile augmentations are used in some embodiments to indicate other imperceptible qualities of one or more of network performance and asset configuration for the geographic space. In some embodiments, the real world view is a street view, meaning it corresponds with the view of the space as seen by a human user situated (e.g., standing, driving, sitting, etc.) in the space.

Network relevant data characterizing the environment of a viewing device or user is conveyed by augmentations so that human senses are capable of perceiving the information about the network. Visual augmentations may be one or some combination of one or more colors, shapes, polygons, visible textures, patterns, lines, and visible objects, for example. Visual augmentations may be static or dynamic. Audial augmentations may be any one or some combination of sounds. Audiovisual augmentations, as the name implies, include both visual and audial outputs for the purposes of augmentation. When the perspective of a user changes or the user has an interaction with the environment or some element in the environment, such as another person or a telecommunications asset, the augmentations may be adjusted, updated, or removed. New or modified augmentations may be provided by an output device as a result of live interactions between the user or camera capturing the real world image (or image feed, as in a video) and another individual, device, or system. Sensory augmentation, including but not limited to audial, visual, or audiovisual augmentation events, may be triggered or interacted with in real time. Augmentations may represent assets or network performance of the past, present, or that which is expected in the future (e.g., based on new assets that are scheduled for deployment but not yet deployed).

As an example implementation and use of an embodiment of the invention, a technician in an office building has a view of an office floor space that includes several routers. He is interested in locating one specific router. To his unaided eye, all of the routers appear identical (e.g., because they all are the same make and model.) An image is captured corresponding to his view of the office space. This image is divided into parts, with one specific part containing the target router and not containing any of the other routers. The part depicting the target router has a visual indicator applied such as a green filter superimposed over it while no change is made to any other part of the image. In this way, the part of the image containing the target router is now visibly different than the appearance of all other routers in the office space. Alternatively, a red filter could have been applied over the parts of the view containing any router that was not the target router. In this way, the appearance of the part of the view containing the target router has no change applied directly to it, but by the change in appearance of the parts of the view containing any other router, the target router is visually indicated. The technician understands that the part of the view which contains a router which does not have red filter applied is the target router. As still another alternative, the green filter and the red filter as just described could both be applied. In this way, the technician knows the part of the view indicated with a green filter has the target router, and the part(s) of the view indicated with a red filter do not have the target router. This is just one example application of an embodiment of the invention.

The one or more processors are configured to determine which virtual objects should be shown with augmentations. Some of the virtual objects may obscure others given their respective locations and given the current field of view of the real world image, and therefore the one or more processors can determine that those obscured virtual objects should not be displayed as augmentations in the virtual image. Or the one or more processors may be configured to display virtual objects that should be obscured, with a different augmentation to indicate that the corresponding real world object is not visible in the real world display. In one embodiment, the one or more processors are provided with virtual objects where one such virtual object is a ceiling tile and another virtual object is an Ethernet jack, where the ceiling tile is in front of the Ethernet jack given the current field of view of the real world image—in this situation the one or more processors could display a special augmentation overlaid onto the ceiling tile to indicate that an Ethernet jack was hidden behind the tile. Another Ethernet jack, represented by a different virtual object, might not be obscured, and might be marked with a different augmentation. In another embodiment all Ethernet jacks could be shown with the same augmentation, and the user's expectations could be set accordingly.

In some embodiments, the processors of a cloud system perform the image analysis that divides the image into parts (with one or more divisions). Network relevant data is retrieved from databases and used by the processors. The processors of the cloud system combine the original real world image data with the network relevant data retrieved from databases to yield an image that is an augmented view of the original view captured by the cameras. Augmented image data is sent to an electronic device that uses its display to show the augmented image to the user.

DETAILED DESCRIPTION

Figure 1A:
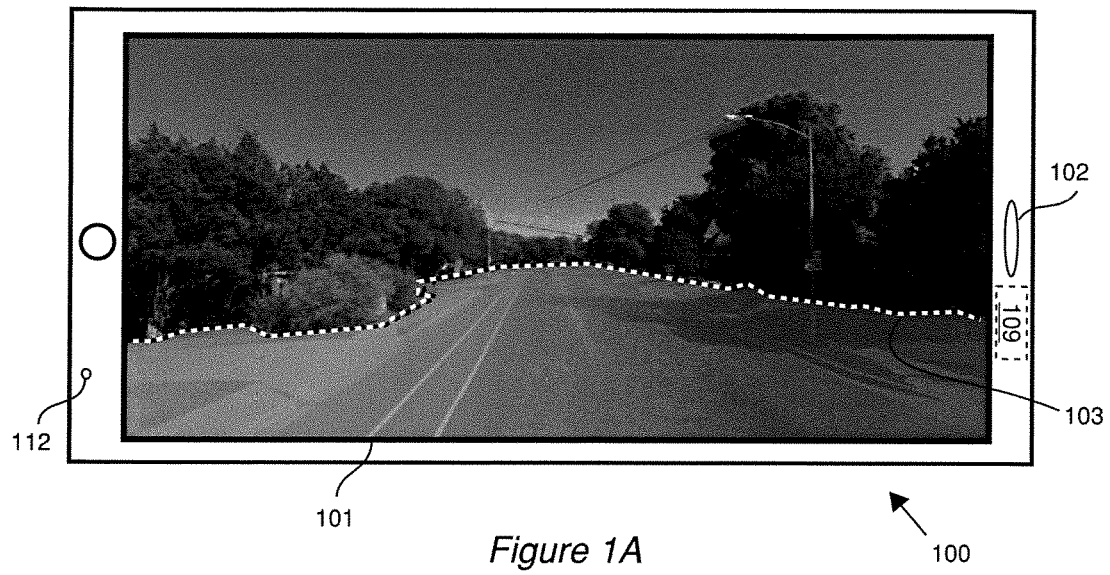
FIG. 1A is a mobile electronic device displaying an augmented image.

As used herein, "augmented reality", or "AR", is a direct or indirect experience of a physical, real-world environment in which one or more elements are augmented by computer-generated sensory output such as but not limited to sound, video, graphics, or haptic feedback. Augmented reality is frequently but not necessarily live/in substantially real time. It is related to a more general concept called "mediated reality", in which a view of reality is modified (e.g., diminished or augmented) by a computer. The general intent is to enhance one's natural perception of reality (e.g., as perceived by their senses without external devices). In contrast to mediated reality, "virtual reality" replaces the real world with a simulated one. Augmentation is conventionally in real-time and in semantic context with environmental elements. For example, many Americans are accustomed to augmented reality when watching American football on a television. A football game as captured by video cameras is a real world view. However, the broadcasting company frequently augments the recorded image of the real world view with the line of scrimmage and first down markers on the field. The line and markers do not exist in reality, but rather they are virtual augmentations that are added to the real world view. As another example, in televised Olympic races, moving virtual lines can be superimposed on tracks and swimming pools to represent the position of a runner or swimmer keeping pace with the world record in the event. Augmented reality that is not in real-time can be, for example, superimposing the line of scrimmage over the image of a football match that is being displayed after the match has already taken place. Augmented reality permits otherwise imperceptible information about the environment and its objects to supplement (e.g., be overlaid on) a view or image of the real world.

Augmented reality differs from a heads-up display, or HUD. A HUD displays virtual objects overlaid onto a view of the real world, but the virtual objects are not associated visually with elements of that real world view. Instead, the HUD objects are associated with the he physical device that is used to display the HUD, such as a reflective window or a smartphone. A HUD moves with the display and not with the real world view. As a result, the virtual objects of the HUD are not perceived as being integrated into the real world view as much as purely being an overlay. When a display pans left, for example, a HUD moves left with the display. In contrast, augmentations (of an augmented reality) would move right with the real world view. Embodiments of the invention are primarily concerned with augmented reality as opposed to HUDs, although HUDs may be used in conjunction with augmented reality.

For a concrete example distinguishing augmented reality from HUDs, consider again televised American football. A line of scrimmage is shown as an augmentation (augmented reality). The line appears in relation to the field and the players within the real world view. If a camera pans left to look at a coach on a sideline, the center of the field, the players, and the virtual scrimmage line all move off to the right hand side of the view where they will eventually exit the field of view if the camera pans sufficiently to the left. In contrast to the line of scrimmage, scores of the competing teams are also usually displayed on televisions. The scores are typically superimposed on the view of the game in a top or bottom corner of the television screen. The scores always maintain a corner position in the television. When a camera pans left from the players in the center of the field to a coach on the sideline, the scores in essence move left along with the field of view, so that they maintain the exact same position on the display. The positions of the scores have no associative relationship to the positions of objects in the real world view. In this way, the scores behave like the virtual objects of a HUD as opposed to "augmentations" as generally used herein.

As used herein, "user" typically refers to a human interacting with or using an embodiment of the invention. Generally, a user will be an engineer, technician, or other person or persons employed by, working under contract with, or otherwise involved with telecommunications companies tasked with telecommunications network design, deployment, or support. When referring to the perspective of a user situated in the geographic space, the user may be, for example, a human user, a robotic user, or a camera.

"Assets" as used herein refers to telecommunications assets, usually characterizable as physical property. For example, telecommunications assets may include electrical hardware and/or associated infrastructure that contributes one or more functions to a telecommunications network. Examples of assets are base stations, switches, routers, hubs, computers, test equipment, antennas, connectors, splitters, probes, repeaters, extenders, transceivers, access points, hardware running virtual computing environments, and towers, and may also include collections, combinations, or groups of assets. Asset configuration encompasses asset placement, position, orientation, status, condition, etc.

Location information may be absolute (e.g., latitude, longitude, elevation, and a geodetic datum together may provide an absolute geo-coded position requiring no additional information in order to identify the location), relative (e.g., "2 blocks north of latitude 30.39, longitude −97.71 provides position information relative to a separately known absolute location), or associative (e.g., "right next to the copy machine" provides location information if one already knows where the copy machine is; the location of the designated reference, in this case the copy machine, may itself be absolute, relative, or associative). Absolute location involving latitude and longitude may be assumed to include a standardized geodetic datum such as WGS84, the World Geodetic System 1984. In the United States and elsewhere the geodetic datum is frequently ignored when discussing latitude and longitude because the Global Positioning System (GPS) uses WGS84, and expressions of latitude and longitude may be inherently assumed to involve this particular geodetic datum. For the present disclosure, absolute location information may use any suitable geodetic datum, WGS84 or alternatives thereto.

"Geo-coded" is an adjective used herein to indicate that the noun it modifies, usually a datum or data of a particular type (e.g., asset data or measurements data), is paired with geographical location information identifying a geographic point (e.g., latitude and longitude and elevation, physical address, etc.) with which the noun (e.g., the datum or data) is associated. GIS data is a geo-code with which other data may be geo-coded. As an example, a measurement of signal strength is geo-coded to identify a particular geographic location where that measurement was taken. As another example, asset information such as the specs of a base station is geo-coded so that it is possible to pinpoint exactly where the base station is physically located.

"Network" is defined as a collection of one or more assets, equipment, and devices which are connected so as to enable communication across or between different points. "Network", as used herein, generally refers to one or more telecommunications networks. "Global" is an adjective which can but does not necessarily mean pertaining to the entire globe or Earth's surface. Generally, unless the word's context explicitly states otherwise, "global" as used herein is intended to mean pertaining to an entirety of a telecommunications network. For example, AT&T Inc., T-Mobile, and Verizon Communications Inc. are all telecommunications companies which individually may have networks limited to North America. However, a single network may cover an entirety of the Earth's surface, or an entirety of Earth's habitable surfaces.

"Network performance" may be measured and described according to a number of different metrics. Network performance data may describe network performance, such as for one or more specific locations, according to a time in the past, present, or future. Where network performance is described by a model that predicts or simulates network performance (e.g., at a future date or as a time lapse movie), the results generated by such model or simulation are described as "prediction data" as well as "network performance data". Network performance may be characterized in terms of, for example, received signal strength, best server, throughput, error rates, packet latency, packet jitter, symbol jitter, quality of service, security, coverage area, bandwidth, bit error rate, packet error rate, frame error rate, dropped packet rate, dropped call rate, queuing delay, capacity, signal level, interference level, round trip time, bandwidth delay product, handoff delay time, handoff frequency, signal-to-interface ratio, signal-to-noise ratio, call quality, link budget, Eb/No (average bit energy/noise), Ec/Io (average chip energy/interference plus noise), physical equipment price, and cost information.

"Network relevant data" is data/information that is recognizable to one of skill in the art as having relevance and potential use in determining or rationalizing network performance. Network relevant data includes but is not limited to geographic information system (GIS) data, measurement data, project data, asset data, forecast data, and prediction data. Examples of GIS data includes but is not limited to elevation, land-use, clutter, building vectors, floorplans, traffic, population density and demographics, and network subscriber locations and densities. Examples of measurement data includes data describing network performance, e.g., data describing one or more of received signal strength, best server, throughput, error rates, packet latency, packet jitter, symbol jitter, quality of service, security, coverage area, bandwidth, bit error rate, packet error rate, frame error rate, dropped packet rate, dropped call rate, queuing delay, capacity, signal level, interference level, round trip time, bandwidth delay product, handoff delay time, handoff frequency, signal-to-interface ratio, signal-to-noise ratio, call quality, link budget, Eb/No (average bit energy/noise), Ec/Io (average chip energy/interference plus noise). Examples of project data includes project type or category (e.g., measurement campaign, new tower site, maintenance, configuration change, etc.), project states and/or status, project dates (e.g., start dates, completion dates, commitment dates, other dates or deadlines on which events for the project occur, etc.), team members, project ownership, geographic region for project, resources allocated to the project (e.g., equipment, budget, etc.), dependencies on other projects, and project priority. Examples of asset data includes equipment type, location, logical network address, configuration settings, owner or person responsible for the asset, service dates, maintenance history, orientation (e.g., orientation of a directional antenna), physical or logical links or connections to other assets, and dependencies on other assets. Examples of forecast data includes forecasted per subscriber data usage, call rates, call durations, anticipated changes in GIS data, and changes in total number of subscribers in a particular geographic region. Predictive data is equivalent to simulated measurement data. That is to say, predictive data is data representing network performance on one or more dates (typically one or more dates in the future) generated by network performance modeling (e.g., network performance modeling of a predictions module). As discussed in greater detail below with respect to some exemplary embodiments, one or more virtual worlds are provided in some embodiments, and at least some of the virtual objects created in a virtual world are based on (e.g., describe or represent) network relevant data (e.g., any one, some, or all of the network relevant data described in this paragraph).

"Unaided", as used herein, is an adjective used to exclude the use or presence of mediated reality devices or systems. A person's unaided view of a street, for example, is the view of the street as seen by the person without the use of an augmented reality or virtual reality system. "Unaided" does not exclude corrected vision devices such as contacts or glasses which are used by people to correct physiological flaws (e.g., nearsightedness or farsightedness). In other words, an unaided view can be the view as seen through ordinary glasses or contacts which are used solely for obtaining the ordinary human eyesight (often referred to as "20-20 vision"). Unaided can described vision as well as any other human sense such as hearing or touch.

"Imperceptible qualities" are qualities (e.g., the existence or characteristics) of something that are imperceptible to an unaided person (e.g., a person without special instruments for modifying their ordinary vision, hearing, or sense of touch). The opposite of "imperceptible" is perceptible, or subject to perception by an unaided person. For simplicity of illustration, many embodiments herein focus on visual augmentations for "unseen qualities." However, it should be appreciated that such embodiments are illustrative and, in general, may alternatively or additionally provide or support augmentation with respect to other human senses (e.g., hearing, touch) for qualities which are not perceptible to those respective senses. "Unseen qualities" of network performance and/or asset configuration includes network relevant data that is undetectable to the unaided human eye. In other words, qualities of network performance and asset configuration that are not visible in a real world view are characterized as "unseen" in this disclosure, although they may be visible in an augmented view which includes the real world view. Many aspects of network performance are unseen since they involve electromagnetic or electrical signals which do not involve the visible spectrum (the frequencies of electromagnetic radiation visible to the unaided human eye). Asset configuration aspects include both the seen and unseen. For instance, assets themselves are generally physical devices. However, these may be visible to the unaided human eye if they lie in plain sight (e.g., a dish on a tower facing the human viewer) or they be unseen by the unaided human eye if they are not in plain sight (e.g., a dish on the opposite side of a tower from the human viewer; wiring that runs inside a wall or above ceiling tiles). Moreover, asset configuration involves many qualities of physical hardware that are not apparent by visual inspection, for example the ownership of a particular dish on a tower, the specific network to which the dish is connected, etc. These qualities and other qualities are subject to augmentation according to embodiments of the invention.

"Real time" or "live", as used herein, means two or more events are simultaneous except for a delay of up to 10 seconds, preferably no more than 1.0 second, more preferably no more than 0.5 second, still more preferably no more than 0.1 second, and most preferably no more than 0.05 second. For example, in example embodiments disclosed herein which provide a form of augmented reality, there will inevitably be a processing delay—albeit a very small processing delay—between the time that input data is captured or collected (e.g., a camera captures an original real world image, a magnetic sensor collects a compass reading, a gyroscopic sensor collects rotational data, a linear acceleration sensor collects acceleration data, etc.) and the time an augmented image is shown by a display device. This delay includes the sensor's or sensors' processing time, the one or more processors' processing time when determining and rendering the augmentation (e.g., visual indicators), the display device's processing time to actually set pixel values or the like, and the time it takes for signals to pass between these devices (e.g., over wireless and/or wired connections). These time intervals are preferably small and, in exemplary embodiments, not perceivable by humans observing the process.

Referring now to the drawings, FIG. 1A shows an electronic device 100 (e.g., a mobile phone) with a display 101 (e.g., a screen) showing an output according to an example embodiment of the invention. The electronic device 100 includes a speaker 102 as an additional output device besides the display 101. The display 101 and the speaker 102 are both accurately regarded as "output devices", as is the entire electronic device 100 by virtue of the display and speaker being integral therewith. The electronic device 100 comprises or is connected with additional sensors such as an accelerometer 106, gyroscope 107, magnetic field sensor or magnetometer 108, proximity sensor 109, barometer, 110, thermometer 111, and microphone 112. The sensors collect the respective data of their respective types (e.g., magnetometer collects magnetic field data or compass data).

Figure 1B:
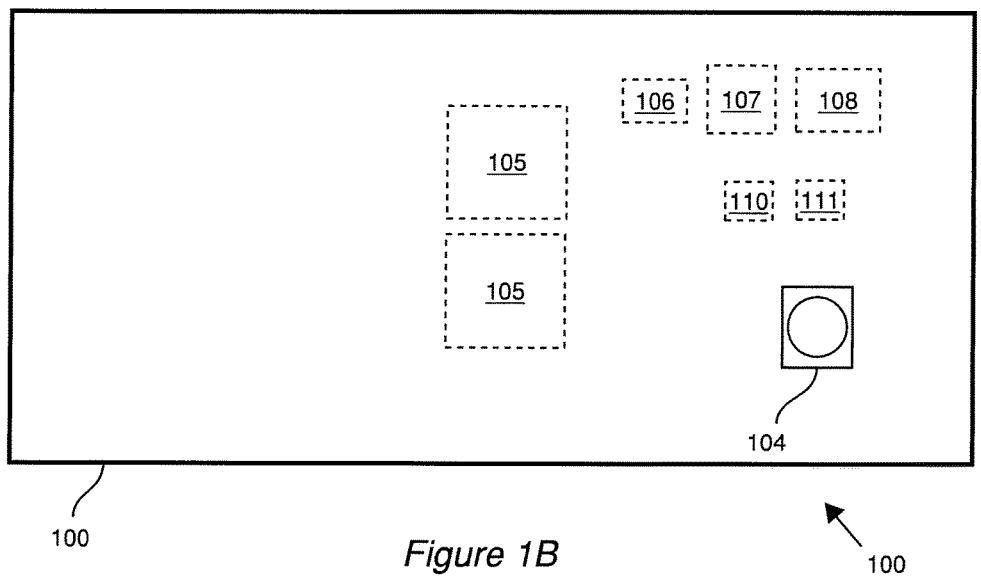
FIG. 1B is a rear view of the device of FIG. 1A.

An image of a real world view of a geographic space is captured using one or more cameras. FIG. 1B shows a camera 104 on the rear side of the electronic device 100. As used herein, "camera" is a device capable of capturing and characterizing incident electromagnetic radiation (i.e., "light") so as to recreate a visual image as a photograph or a series of images forming a film or video. Cameras of some embodiments capture only the visible spectrum (i.e., what humans see naturally). While general consumer cameras concern only the visual spectrum detectable by the unaided human eye, other embodiments of the invention may use one or more cameras which are capable of capturing wavelengths of light which are not visible to unaided human eyes, for instance infrared or ultraviolet light. For the example of FIGS. 1A and 1B, the geographic space that has been imaged is a portion of a neighborhood street that includes the street itself, driveways, portions of lawns, bushes, trees, and lampposts. The image is based on incident light in the visible spectrum. The image (or images) captured by the camera is characterized by data that describes both contents of the image (e.g., colors, pixels, etc.) and aspects of the image's capture. The capture of an image is characterizable with pose (which includes both position and orientation) and field of view.

A real world image may include (e.g., if from a city's street intersection camera for instance) HUD displays of date and time, or even could have augmentations in it from another augmented reality system that is providing video to a system based on the present disclosure. Input to one or more processors herein which is described as an image of a real world view may also or alternatively include one or more images which are not of a real world view. In general an augmented reality system need only have some portion of its input that is real. In some embodiments this may be a relatively small portion. Augmented reality systems may be used to modify the augmentations of other augmented reality systems in more complex applications, e.g., a system comprises distributed independent augmentation engines which make use of each other's output.

The data from the camera(s) 104 and collected by the other sensors (e.g., 106, 107, 108, 109, 110, and/or 111) is received by one or more processors 105. The camera data describes an image (or images) of a real world view of the geographic space in the vicinity of the camera and, in some but not all embodiments, in the vicinity of the operator of the camera. In this example, the camera 104 and the display 101 are part of the same unitary electronic device 100, and the geographic space is also in the vicinity of the output device, display 101. The camera 104 and the electronic device 100 that includes the camera 104 may be regarded as the viewing device. Viewing devices may include various types (but not necessarily all types) of cameras, mobile electronic devices, mobile phones, tablets, portable computers, wearable technology, and the like. If the electronic device 100 were a head-mounted display (HMD), the HMD would be characterizable as a viewing device, too. A HMD that has no cameras, such as some see-through HMDs, may still qualify as a viewing device. A lens or pair of lenses of the see-through head-mounted display also qualifies as a viewing device.

A user is able to view and benefit from what is shown by the output device, display 101, in real time. The real world view captured by the camera is from the viewpoint of a human user as if the user were situated in the space (e.g., sitting, standing, walking, driving, biking, etc.). In many but not all embodiments, the user is situated in the space. A display is but one type of output device usable for providing augmentations. Displays, speakers, and vibratory devices are different examples of output devices usable in embodiments of the invention for providing augmentation outputs to a user detectable with their senses. In some embodiments a viewing device and an output device are the same device or part of the same device. For instance, an HMD may be accurately characterized as both a viewing device and an output device, as may a mobile phone or tablet that has both a camera and a display screen. Alternatively, viewing devices and output devices may be separate devices arranged at completely separate locations. A camera and sensors which are part of a viewing device collecting data about a real world view may be a first location and an output device like a display and/or speaker which provides augmentations with a reproduction of the real world view may be at a second and separate location at some distance apart from the first location.

The one or more processors 105 are configured to process the data from the one or more cameras 104, as well as other data like data from sensors 106, 107, 108, 109, 110, and/or 111, in order to generate an output useable by an output device to present an augmented reality to a user. In some embodiments, the image and/or sensor data from the cameras/sensors is sent over a network (e.g., the Internet) to one or more remote servers comprising some of one or more processors that perform processing of the data before augmentations are provided to an output device for outputting to a user.

Figure 2:
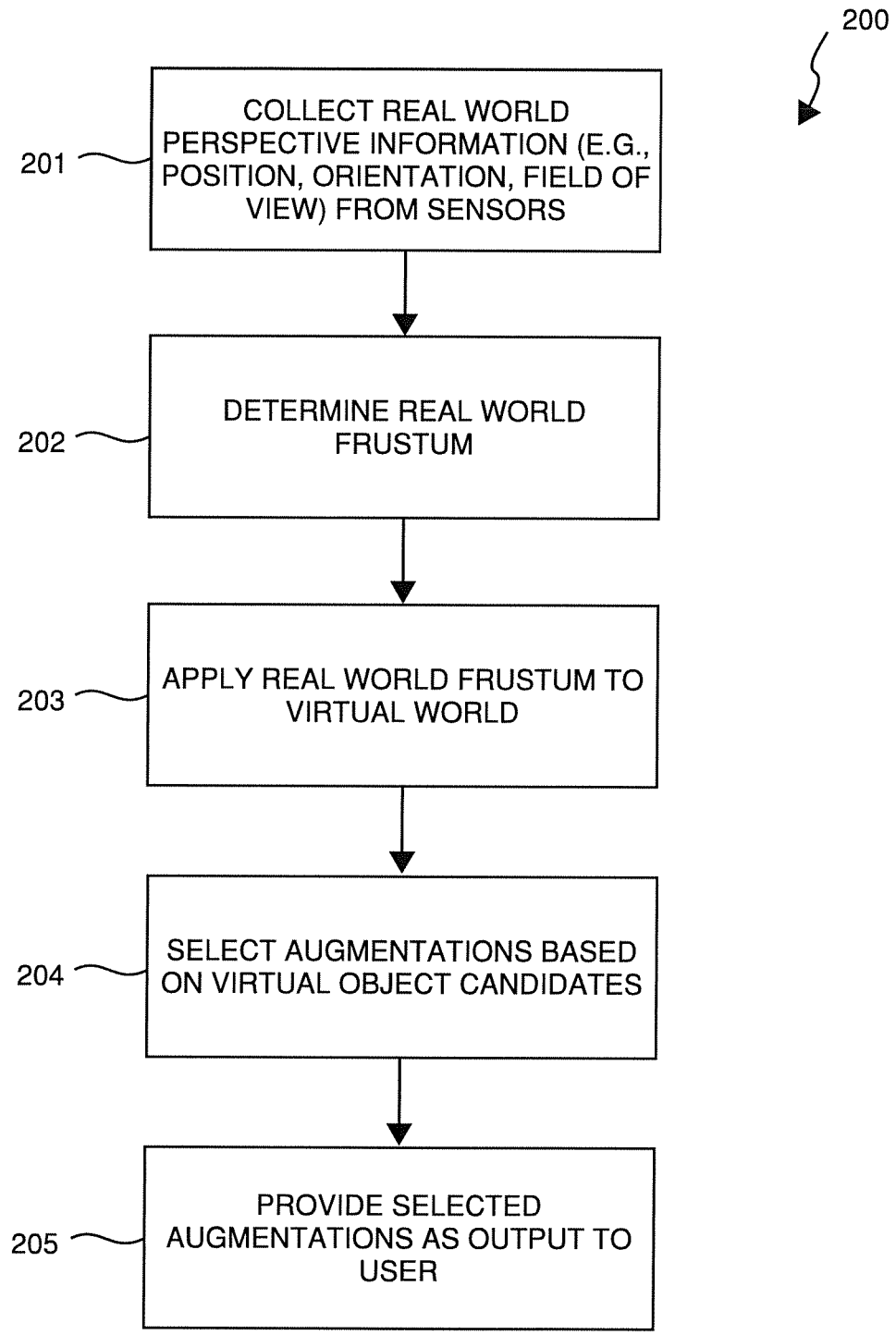
FIG. 2 is an example process for providing an augmented reality.

FIG. 2 shows an exemplary process 200 from the point of collecting information about a real world view to producing an augmented reality for a user. In general, processors (e.g., computers) are used to perform the central work of blocks 202, 203, and 204, which involve data processing. According to an exemplary system that uses a GPS sensor, digital compass, and gyroscopic sensors, for example, the 3D position and orientation of a camera co-located with those sensors is determined (block 201). Based on that 3D position and orientation of the camera, and on assumptions about the near and far field limits, a 3D real world frustum is determined (block 202). That 3D frustum is applied to a virtual world, and thus determines what virtual objects are candidates for augmentation into the original camera images (block 203). The selection of augmentations based on the virtual object candidates (block 204) may involve one or more criteria including, for example, user option selections and the relationships between different virtual objects. For instance, the processors may determine which of the virtual objects obscure parts of each other based on the frustum in the virtual world. The output is showing resulting 2D projected virtual object representations as augmentations (e.g., written into the original image) (block 205). Note that the process 200 according to some embodiments may involve little or no image processing whatsoever. Image processing may also be used, however, as will be described in further examples below.

The 3D virtual representation or virtual world used in block 203 is stored as data in one or more databases. The databases include, for example, geometric aspects of the virtual representation and characteristics of the objects which are instantiated within that virtual representation.

In some embodiments, the one or more processors are configured to use some combination of some or all of the following to determine which virtual objects should be provided (e.g., shown or otherwise output) as augmentations: digital compass input from a magnetic sensor; rotational data from a gyroscopic sensor; acceleration data from linear acceleration sensors; GPS data (latitude, longitude, altitude, and geodetic datum) from a GPS sensor; or image data from a video stream (which may itself include augmentations from other AR systems). The processing of this information is used to determine the real world viewing device's (e.g., camera's) position, orientation, and field of view (expressed as a frustum), and to estimate an accuracy of that determination. For example, the one or more processors may determine a viewing device's (e.g., camera's) six-dimensional location. Location may be the set of latitude, longitude, altitude, geodetic datum, and orientation, or include some combination of these. Orientation may be determined as a combination of angles, such as a horizontal angle and a vertical angle. Alternatively, orientation may be determined according to rotations, such as pitch, roll, and yaw. Based on the real world viewing device's (e.g., camera's) frustum, and on the detected placement of any relevant image data in the image, augmentations may be displayed as sourced from the 3D virtual representation (a virtual world), as modified by characteristics associated with that representation, and potentially adjusted due to detected image data.

For example, GPS data along with digital compass and gyroscopic sensor data may be used at a given moment to determine the 3D location and orientation of a camera that is co-located with the relevant sensors. The resulting real world frustum might then be applied to a 3D virtual representation (a virtual world) to determine that a 3D augmentation cartoon of a base station should be augmented into the current image, at a position corresponding to the expected real world position of a real world base station in the image. At this point in processing, due to some inaccuracies in the various sensors, the putative augmentation might not be exactly positioned on top of the real world base station, which in reality is attached to the top of a cell tower. But as a final or near final step of processing, the augmentation might be adjusted within the image, based on the detection of a tower in the image via image processing, so that the augmentation is moved over to be shown at the tip of the cell tower, based on a rule that the 3D virtual object in question should be "snapped" onto the nearest tower if any such tower is detected in the image. The result is an augmentation of a base station 3D cartoon, overlaid accurately onto the tip of a cell tower in the current image sample.

The one or more processors conduct processing that determine which augmentations should be added to a specific real world view, and as a corollary what augmentations should not be added to that view. There are multiple aspects of a real world view that affect such a determination. A first aspect is the relationship between the viewing device (e.g., a camera) and an "object" of interest. In the context of the present invention, an object of interest will frequently be, for example, a network asset. Another aspect that determines the augmentation is any characteristics associated with the virtual object corresponding to the real world object of interest, e.g., transmit power characteristic of a base station object (which might be used to color code an augmentation).

Blocks 203 and 204 involve determining, using the field of view and pose, which virtual objects should be displayed. The characteristics of those virtual objects (stored in the database along with the geometric aspects of the virtual representation) determine what baseline augmentation to provide and markers/indicators/tweaks are performed on the baseline augmentation. In general, the augmentation that is output (e.g., displayed) depends on all of the virtual characteristics of the virtual objects that are made perceptible given the current perspective of the current image. As a comparative analogy to illustrate this point, a car may give haptic feedback (vibration) to the steering wheel when the operator drives over the centerline of the road without using a turn signal. There is no visual augmentation at all, and yet it is a visual part of the real world sensory input that drives the determination that the haptic feedback will be presented. If the operator indicates his intent to change lanes by tapping the turn signal arm, a characteristic flag of the system is set, and the haptic augmentation is not presented to the user, who in that case perceives nothing from the augmentation system.

The following is a specific example of virtual objects that are not themselves generative of augmentations but which affect the augmentations generated by other virtual objects. A virtual representation of a particular building might never be shown to the user, because it could be confusing to show the virtual building overlaid onto its corresponding real building which is clearly visible in the input image. However the virtual representation of that particular building could be used to determine that a virtual representation of a particular base station is behind the building given the current real world frustum, and so to determine that the augmentation for that base station should not be added to the output image as it is obscured. In the resulting output image, the user would see the real world building in the image as it was present in the original input image, would not see any augmented representation of the building, and would also not see the representation of the particular base station in question.

In embodiments of the invention, processing steps such as blocks 202 to 204 in FIG. 2, may be configured as a greater or fewer number of steps and organized hierarchically (e.g., with substeps).

The one or more processors may be configured to perform image processing. The processing may include determining the presence or absence and position within each image in a camera stream of detectable visual elements, e.g., shapes such as buildings or towers. The 3D shape of objects is something usually detected based on a series of real world images. Detection of 3D objects in the original real world image, or detection of any other aspects of the original image which might affect the augmentation enables the generation of augmentations that are irrespective of the position and orientation of the viewing device (e.g., real world camera), or the refinement of the position/orientation based augmentations to be more accurately placed into the output image, or the refinement of their presentation. For example, the average light level across the entire image may be used to estimate the ambient light level in the real world scene, and then that resulting ambient light level estimate may be used to increase or decrease the brightness of the added augmentations so that they are more realistic.

Image processing is conducted is some exemplary embodiments using a convolutional neural network. A convolutional neural network comprises computer-implemented neurons that have learnable weights and biases. A convolutional neural network employs a plurality of layers and combines information from across an image to detect an object in the image.

Various image recognition techniques may be employed, some of which employ a convolutional neural network. Examples are targeting, windowing, and classification with a decision tree of classifiers. The following is an illustrative example of how windowing may operate. A window (within an image's frame) is the focus of study. The window is progressively moved throughout the frame. A window corresponds with a single pass through the convolutional neural network. Within the window a general object of interest is searched. For instance, the first window may serve to identify a human face with indifference as to any specific qualities of the human face. Only after the general object of interest is found, does a second network or second pass through the network attempt to identify a specific object of interest, such as a specific person's face. Changing the window with each pass, and changing the parameters of the search, is a successive or iterative process of targeting to target a particular object of interest.

Processing by one or more processors in some exemplary embodiments includes tracking. For a series of images, as with video, a determination is made whether a target is moving, the camera is moving, or both. The one or more processors are configured to associate objects in one frame with the same object in another frame.

In some cases, the processing of the real world view may be described as dividing an image into parts or dividing the image into areas, each area being characterizable by different attributes. The attributes of an area of an image may include, for example, a direction and a location. In some cases, real world images are divided using metadata. For example, objects in viewing range of an observer may be geocoded. The division of the image of the real world view into a plurality of parts involves digital image processing that may include but is not limited to boundary detection and object recognition. The procedure or procedures involved with the digital image processing can vary between embodiments.

As one example of image processing, the image is first be divided into parts recognized as depicting flat/horizontal surfaces (e.g., the ground, streets, sidewalks, driveways, fields, lawns, parking lots, roof tops, floors, ceilings, etc.) and parts which do not depict flat/horizontal surfaces (e.g., bushes, trees, telephone poles, light poles, vehicles, people, animals, fire hydrants, building sides, walls, cubicles, desks, chairs, etc.). As used herein, "horizontal" or "flat" means substantially so. A hard standard of comparison that may be used is what humans accept as "ground" elements and/or lends itself to being walked on. Hills and heavily inclined streets are not perfectly horizontal or flat but are regarded as being part of what is commonly referred to as the "ground". These elements would qualify as horizontal or flat as per the use of these terms in the context described herein. In FIG. 1A, the augmented reality illustrated is obtainable with a dividing procedure, among alternative procedures. The first division has divided the image into just two parts, shown separated by broken line 103. With respect to the figure's orientation, the "lower" part depicts flat/horizontal surfaces and the "upper" part depicts everything else. Lines or curves may optionally be displayed to show boundaries between parts as in this example. Alternatively, the boundaries between parts may not be directly displayed.

After the first division into parts, the parts depicting flat/horizontal surfaces are then divided again. According to an example procedure, the second division is into equally sized subparts (e.g., into areas that would have equal surface area within the context of the geographic space) as if a grid were superimposed on the ground and each square of the grid is one part of the plurality of subparts. The size of each square can be large (e.g., several square feet or meters) or small (e.g., a square centimeter) depending on desired resolution.

Referring to FIG. 2, and particularly block 205, augmentation is provided using one or more (i.e. at least one) sensory modality which is used to indicate imperceptible network relevant data (e.g., qualities of network performance or asset configuration). Sensory modalities may be visual, audial, tactile or haptic (e.g. vibration), or olfactory, or any combination thereof, e.g., audiovisual. Augmentations may be take the form of 3D representations of real objects (e.g. a detailed 3D representation of a cell tower), or of abstractions of real objects (e.g. a cell tower represented as a simple cylinder with a sphere at the top), or of markers, indicators or cues (e.g. an arrow pointing to a location in the image, or a textual label next to the arrow). Some information modeled in the virtual representation has no corresponding real world shape. For example, a wireless network link between two wireless network antennas has no real world visible representation, so any augmented presentation of that connection is necessarily some kind of abstraction (e.g., a geometric shape). On the other hand some information in the virtual representation may have at least one straightforward augmentation that is minimally abstract, e.g., a 3D graphic of a building that is positioned, shaped and colored to be very much like the corresponding real building.

The virtual objects are stored and manipulated as data within one or more databases. The virtual objects have their own existence separate from how they are displayed, visualized, haptically buzzed, or otherwise output by an output device. So, generally speaking, a virtual object has its own characteristics, and then, based on those characteristics and on the real and the virtual environment, an exemplary augmented reality system determines what is presented to the user. If a given virtual object is obscured, then it is not presented to the user as an augmentation, but on the other hand if the system determines that a given virtual object should be visible to the user given the viewing device's position and orientation in the real world and therefore its position and orientation in the virtual world, an augmentation may be displayed (or otherwise provided).

Sensory indicators/cues are a particular kind of augmentation that is in some embodiments additional to the basic display associated with for example a should-be-visible virtual object. For instance, if there is a virtual object that is a base station, the system may have a 3D cartoon version of a base station that is show as an augmentation when appropriate. However, if that base station is currently experiencing a technical fault, for example, the system may additionally elaborate that 3D base station cartoon with a red halo to show that there is a special condition associated with it. Of course the 3D base station cartoon augmentation itself is a sensory indicator (in particular a visual indicator), but in this disclosure a distinction can be made between a baseline augmentation and augmentations with additional aspects/indicators. Some indicators/cues may consist not of an additional graphic element, but of some modification of the baseline element. For instance, for the 3D base station cartoon visual augmentation, instead of adding a red halo to the graphic, one could alternatively visually "break" it in half with a jagged break to indicate that there is a problem, or one could make it pulse in size to draw attention to it. The base station has a 3D representation stored in the database (a geometric list of vertices, etc.), whereas the information that drives the display of indicators/cues would typically (though not exclusively) be some combination of scalar numeric characteristic values or Boolean flags (e.g. alert status flag, transmit power level, etc.).

An augmentation may correspond with a virtual object that has a specific location in a virtual world. The virtual world is characterized by a number of locations which correspond with real locations which appear in an image or frame of the real world. In essence, a virtual world (e.g., a virtual model of the real world) is populated with virtual objects corresponding with either or both seen real world objects and unseen qualities of network performance and assets. A virtual world view is characterizable with a frustum. A frustum includes position, orientation, field of view, and near and far limits of the field of view. A real world view is similarly characterizable, except that in a real world view there is technically no hard limit on near and far limits of field of view.

As a concrete example, an image of a real world view (i.e., a real world image) may include within its field of view a building with a typical rectangular shape. The building has a particular GPS location. More specifically, each of the four corners of the building that touch the ground has their own GPS coordinates. In a corresponding virtual world, a virtual object in the form of a rectangular prism exists at coordinates which align with the real world GPS coordinates. The virtual object (in this case the rectangular prism) if displayed in an augmented reality would align with the real building in any augmented view so that the two objects—the real world object and the virtual object, align, one superimposed on the other. If there is a second building in the real world across the street from the first building, and wireless signals are passed between the buildings, virtual objects may be provided in the virtual world representative of each of the buildings as well as the wireless signal path between the buildings. These virtual objects can exist irrespective of whether they are produced as indicators or augmentations in any given augmented view. Embodiments of the invention are configured to receive user setting or preferences, which can be changed, to toggle whether virtual objects are made visible via augmentations or not in an augmented view displayed or otherwise output by an output device.

Some augmentations are or include a solid 3D model rendered within the context of the real world image. As alluded to above, some augmentations are subject to be changed or replaced or substituted entirely over time. Some augmentations are animations superimposed on the real world image. For example, an augmentation may be a scaled 3D model or animation that is played based on some event, e.g., a network outage as if it is occurring in real time. Animations may be triggered (e.g., macroed) based on such an event.

In some embodiments, the selection and provision of one or more augmentations (e.g., FIG. 2, blocks 204 and 205) is based on (e.g., dependent) on the user and differs from one user or individual to the next. Different viewers or users may be provided unique augmentations and thus unique or at least different augmented reality experiences. As an example, a difference can be varying levels of detail (e.g., more details or fewer details) offered to a first user as compared to that which is offered to a second user.

FIG. 1A shows an augmentation that is color coding of flat/horizontal (e.g., ground) surfaces to characterize wireless performance characteristics of the open space above the surface. Open space is ordinarily occupied by air but can be occupied by a network connected device such as a mobile phone passing through the open space as a user carries it while in transit. The parts of the image showing flat/horizontal surfaces—in this example the street, sideways, driveways, and grassy spaces—are divided into smaller subparts which each take a particular color, the color for each subpart being the visual indicator applied to that subpart. A green color, for instance, can indicate a strong wireless signal, a red color can indicate poor or nonexistent wireless signal strength, and a yellow color can indicate wireless signal strength between strong and non-existent. The size of the subparts can be extremely small so as to give a very high resolution. This is the case for FIG. 1A, where the subparts are so small they are not individually perceived by a user, resulting in the appearance of continuous color gradient across the subparts which correspond with the street, sidewalks, driveways, and grassy spaces of the image. A key may be provided that indicates the exact numerical value of signal strength corresponding with a given color.

Figure 3A:
FIG. 3A is an image of a real world view of an office space.
Figure 3B:
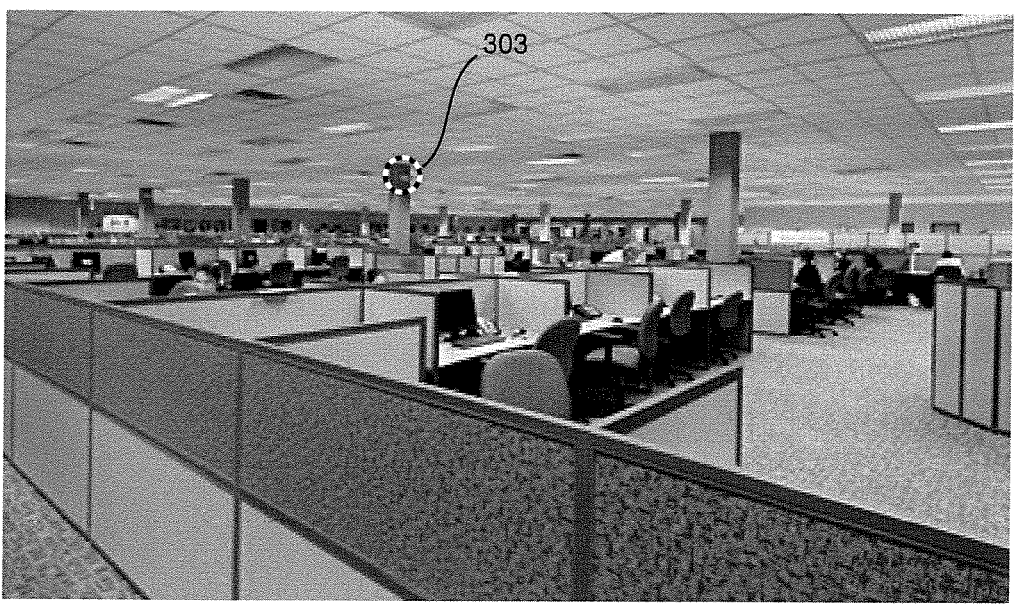
FIG. 3B is an augmented image of the view from FIG. 3A.

FIGS. 3A and 3B show another example of differentiating parts of the real world view using augmentations. In this example, a technician endeavors to find a specific hardware component inside an office space. He may desire to locate a router with a particular address, but multiple routers 301 are visible. FIG. 3A shows the technician's unaided view of an office space, as may be captured and reproduced as an image feed on a display of an electronic device 100 like that depicted in FIGS. 1A and 1B. Some routers 301 are visible on support columns, but it is impractical if not impossible for the technician to determine which router he needs to find (the "target" router or device) from unaided visual inspection of the office space. Perspective information including position and orientation are collected using sensors in the technician's device. A real world frustum is determined and applied to a virtual world containing virtual objects which relate to the office space. A virtual object that corresponds with the target router is selected, and an augmentation 303 which in this case is a circle is provided around the view of the router as shown on the display device. In addition or alternatively, the image of the technician's view is captured and minimally processed so that it divided into two parts: a first part that contains the target router and no other routers, and a second part that contains all other routers. The augmentation 303 is then used to signify that the target router is in the first part. In this case, the augmentation 303 is a circle which contains only the target router.

Figure 3C:
FIG. 3C is another augmented image of the view from FIG. 3A.

FIG. 3C maintains the example of the technician in the office space. Here, however, additional visual augmentations are provided. For example, other routers with which the first target router is connected are also visually distinguished from the rest of the office space objects in the image. This is accomplished in FIG. 3C using solid circles 305 surrounding each of the routers in the room. In addition, lines 307 are shown which trace the wiring paths within the ceiling that connects each router to the others. The floor of the office may further be augmented with a color code indicator applied across the floor (in this case as a gradient) to indicate wireless signal strength at different parts of the office depending upon where a device is located in the office.

Geolocating is but one form of locating usable in various embodiments of the invention. Geolocation techniques such as using GPS are not as well suited for certain spaces such as indoors. For indoors and elsewhere where desired, a non-geo-located coordinate system may be employed that express object location relative to some other reference point, such as a landmark, the northwest corner of the building, or a particular corner of a particular room.

According to a feature of some embodiments, virtual objects may obscure other virtual objects in the current real world perspective. The obscuring object may cause the obscured object to not be represented via augmentations, even if the obscuring object is itself not shown with any augmentations. For example, a user may see a real world image in which no augmentations are shown at all, despite the fact that two virtual objects are contained geometrically within the field of view. A first virtual object (which for illustrative purposes will be called virtual object A) would be shown with an augmentation if not otherwise obscured. A second virtual object (which will be called virtual object B) entirely obscures A given the field of view, but virtual object B may itself not be currently shown as an augmentation. In this way the virtual objects that represent a virtual world suitable for augmenting a real world view consist of two basic classes of objects. The first class is associated with augmentations. The second class is not associated with augmentations but still interact with the other virtual objects either by obscuring them visually or through other possible interactions (e.g., an augmentation of an object of the first class might be a different color if the first class virtual object is near a virtual object of the second class).

As an illustrative example with respect to the preceding paragraph, Ethernet jacks in an office or home are frequently near the floor. They are also frequently near or in the ceiling. Those near the floor are often obscured from view by furniture. Those near or in the ceiling can be obscured by, for example, ceiling tiles. However, in the absence of the furniture or the ceiling tiles the Ethernet jacks would be in viewing range of the observer. In an embodiment, the one or more processors receive the locations of the Ethernet jacks and the location of objects in the image. The one or more processors can use the relative locations and characteristics of virtual objects which correspond with real world Ethernet jacks to determine the locations of the objects which are not visible. The location of the camera and its directional orientation are used to determine the locations of objects in viewing range. After the right virtual object or objects corresponding to the Ethernet jack are selected, one or more augmentations are provided on a display device based on the virtual object. The augmentation visually conveys that the target Ethernet jack is behind a specific article of furniture or behind a specific ceiling tile despite the Ethernet jack itself being invisible to the unaided eye.

Figure 4:
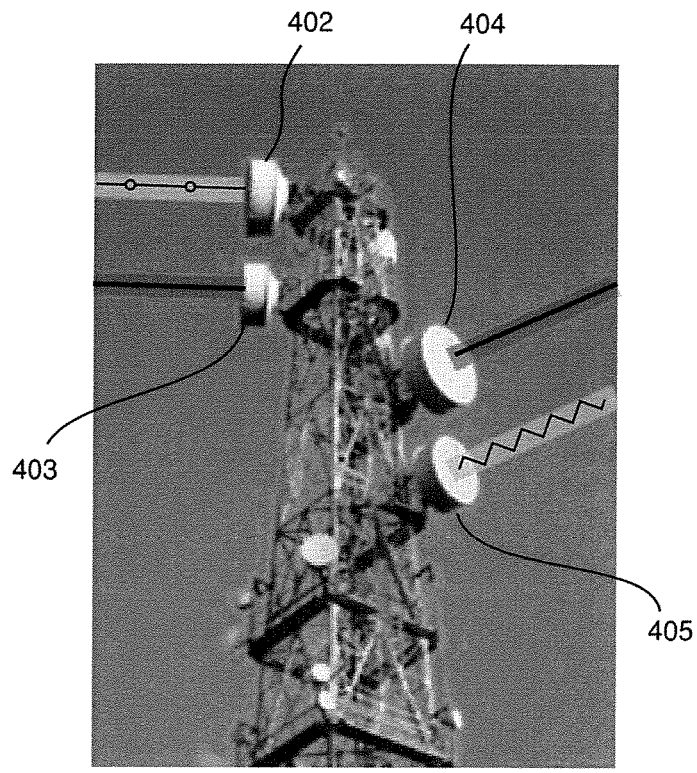
FIG. 4 is an augmented image of a real world view of a telecom tower.

FIG. 4 shows another example of augmented reality. In this example, a technician is tasked with locating a specific wireless antenna or dish affixed to a tower that has multiple dishes. Despite the tower having several dishes attached to it, only one is the wireless dish the technician seeks (the "target" dish). If additional or alternatively using image processing, an image feed of the technician's view is processed with a neural network to recognize and distinguish each dish from its surroundings. The wireless dish is marked with a visual indicator such as an arrow or a unique coloration or opacity such that that specific part is visually distinguished from all other parts (e.g., the rest of the view or at least the other dishes). It should be appreciated that the lack of a visual indicator is itself a form of visual indication. For example, if a dish is unmarked, the technician understands this as not being the target dish because he expects the target dish to have a visual indicator. In FIG. 4, the visual augmentations are lines with different indicators in the form of stylings, where the lines trace the beam direction of each dish, where each line is color coded and/or uses a different line style (e.g., broken, solid, dot-dashed, zig-zag, etc.) to indicate the dish as unique, e.g., belonging to a particular network or company. In FIG. 4C, four dishes are separately visually indicated, with the two middle dishes 403 and 404 belonging to the same network as indicated by both having solid lines extending from the dish. The top dish 402 and bottom dish 405 each belong to some other network.

Figure 5:
FIG. 5 is an augmented image showing network connections paths.

A visual augmentation can be a path (e.g., a line or curve) drawn between or among real world objects appearing within the image. Such a path can be used to convey, for example, devices that are connected by or contribute to the same network (e.g., a mesh network). A path can be indicated to show the connection path (e.g., as the bird flies) for electromagnetic waves between antennas. For example, FIG. 5 shows an image of street view from a road on a hillside where network connection lines 501, 502, and 503 are superimposed for visual indicating the connection paths between antennas which are not themselves sufficiently near to see. As another example, FIG. 1A shows an embodiment in which a line is superimposed on the image of the street between lamp posts. The path indicates connectivity between relays attached to the lamp posts.

Figure 6:
FIG. 6 is an image of an aerial view.
Figure 7:
FIG. 7 is another image of an aerial view.

FIGS. 6 and 7 show aerial images of geographic spaces augmented with visual indicators which indicate unseen qualities of network performance and/or asset configuration. In FIG. 6, a color gradient is superimposed on a portion of the real world image to represent signal strength. FIG. 7 shows an image of an aerial view that shows an unseen quality of asset configuration. The star is a visual augmentation signifying the location of the tower from FIG. 4. The signal connection paths of the four dishes in FIG. 4 are also shown in FIG. 7 despite the fact the dishes themselves are not visible from this particular aerial view.

Images of aerial views such as those depicted in FIGS. 6 and 7 can supplement or be supplemented by embodiments of the invention that show an image that is a street view of a user such as is depicted in FIG. 1A, 3B, 3C, 4, or 5. However, it should be appreciated that aerial views and street views have distinct applications and utility. Aerial views, generally captured by cameras on aircrafts or satellites, are an exemplary tool for network planning and deployment, especially as developed and coordinated in an company office space remote from the geographic space under consideration (e.g., for network planning, improvement, or implementation). Street views showing one or more unseen qualities of either or both network performance and asset configuration can be of considerably greater utility to technicians in the field. It permits a user to understand imperceptible network relevant features of his or her surroundings in semantic context with what his or her eyes and other sensing organs naturally observe or perceive unaided. This advantage is not fully appreciated with just aerial views and maps.

Figure 8:
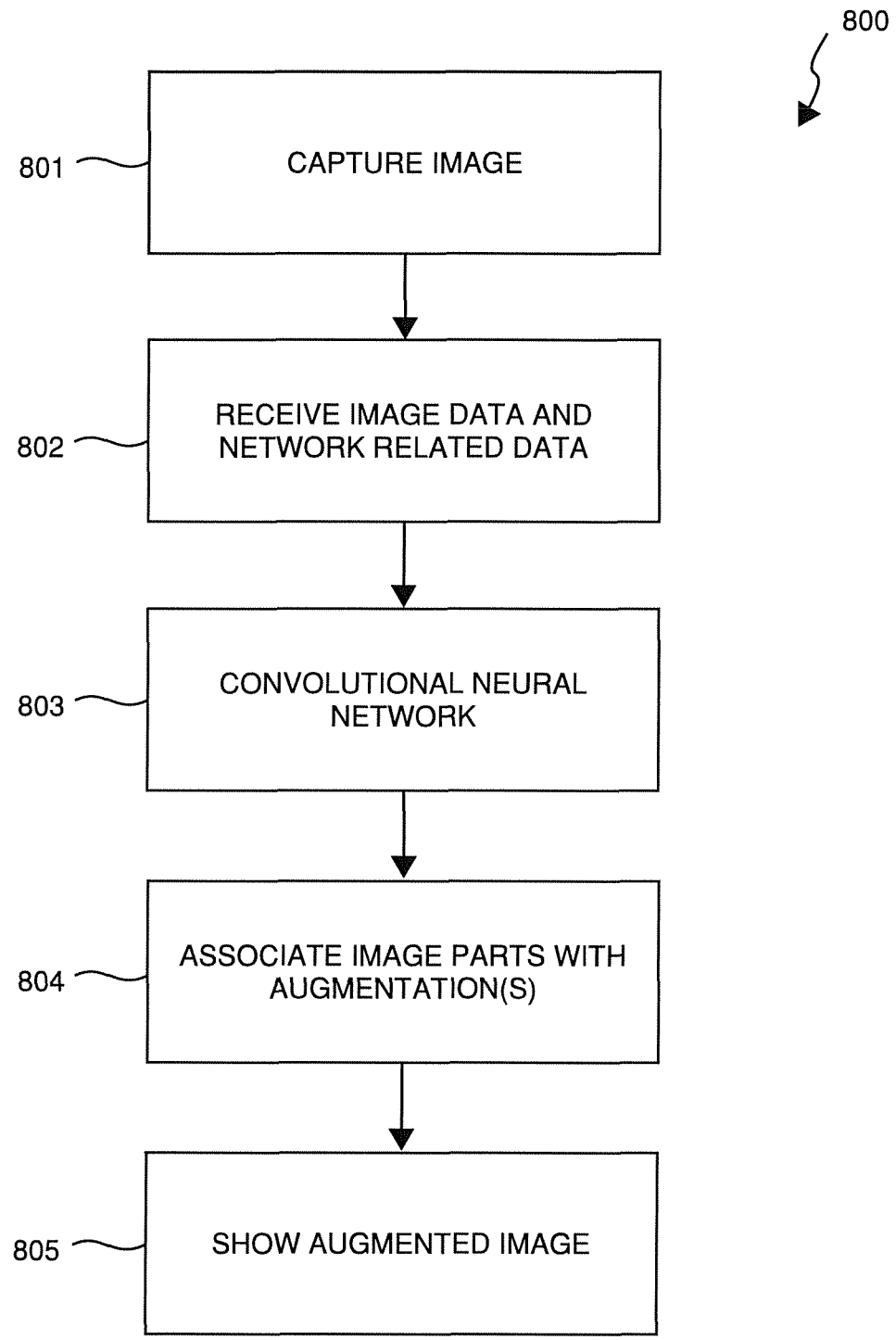
FIG. 8 is an example method of visually representing aspects of a network.

FIG. 8 illustrates an example computer-implemented method 800 for visually and/or audibly representing networks and network relevant data by augmented reality, the method employing image processing. One or more cameras are used to capture image data of a real world view (e.g., a street view) (block 801). The image data of the real world view is uploaded to a cloud system which generally comprises one or more servers containing processors. The processors receive both the image data from the cameras as well as data that describes imperceptible (e.g., unseen) qualities of network performance and asset configuration (block 802). The latter, which falls within the category of network-related data, is generally retrieved or sourced from one or more databases. While the image data can be received in real time from the cameras, it is also envisioned that image data from the camera is stored for some duration of time on a storage medium such as a database, in which case the processors are configured to retrieve or receive the image data from a database as an alternative or in addition to a live feed from the cameras.

The processors run a convolutional neural network on the image feed of the real world view to recognize objects in the image (block 803). More generally, the image data undergoes processing to identify objects, surfaces, or features depicted in the image. Specific parts of the image are then associated with one or more augmentations (block 804). Block 804 may involve the selection of virtual objects that are associated with an identified object in the real world images. The augmentation(s) used may be based on user inputs, such as a task, objective, or selection entered by the user on the mobile device equipped with the cameras. The user inputs can accompany the image data when uploaded to the cloud processors.

Data that describes both the original real world view and the augmentations associated therewith may be referred to as augmented image data. The augmented image data is sent from the cloud processors to an output device, in many cases an electronic device which possesses the original camera(s) used to capture the original image data. The electronic device—or more specifically processors of the electronic device—cause a display device to ultimately show the augmented image feed (block 805). The display device shows the image of the real world view with at least one augmentation that differentiates at least one part of the plurality of parts of the image from other parts of the plurality of parts based on one or more of the imperceptible qualities of network performance and asset configuration.

In many cases, the steps of capturing and showing both occur at a location corresponding to the perspective of the user situated in the geographic space. For example, this is the case when the viewing device (e.g., camera(s)) and output device (e.g., display) are part of the same integral device (e.g., a tablet or smartphone). Alternatively, the step of capturing or collecting data occurs in a first location corresponding to the perspective of the user situated in the geographic space and the step of showing or providing an augmented reality occurs in a second location that is different from the first location. Under these circumstances, the "user" (as in, the user situated in the geographic space) may be an image capturing device such as a video camera, while a human user is nearby or in an altogether separate location such as an office, laboratory, home, or other structure. The video camera serving as the "user" situated in the geographic space has parameters or settings which are known or determinable such as location (e.g., GPS coordinates), viewing orientation/direction, focus, zoom, and lens specifications, among others. The camera location replaces the human location in the field. The camera orientation replaces the human view orientation in the field. The camera's pose (position and orientation) and field of view replace the pose and field of view of the human. Some or all of the camera parameters and settings may be data included with the captured image data. The feed from the camera (or feeds from multiple such cameras deployed in the field) is transmitted (e.g., over a wireless network) to one or more servers which are networked with a computer operated by a human user in a nearby or separate (e.g., remote) location. The providing (e.g., displaying) step to the human user is substantially the same as in other embodiments described herein. That is to say, displaying the augmented images (the augmented reality) is equally possible for human users in the field or in a location remote from the field. All the same use cases previously described are still applicable. The displaying of the augmented images can be in substantially real time or, alternatively, occur after at some later time based on camera feeds and/or augmented images produced in the past and stored on a computer-readable memory.

A user in the field, be it a human or a camera, may be stationary, position adjustable, or moving, such as when a camera is mounted to a drone or robot or transported by a land or aerial vehicle (e.g., a helicopter). The user in the field that is a camera has the advantage that it can capture perspectives in the field which a human cannot ordinarily achieve. For instance, a drone-mounted camera is capable of capturing real world views/images of a geographic space from arbitrary heights above ground level, including heights well above the highest reach of ordinary adult humans. In some cases, one or more users in the field may be traffic cameras. Robots or robotic mechanisms are capable of accessing a wide variety of spaces, including many spaces where humans cannot themselves go do to size, safety, or practicality constraints. For instance, a robotic device is useable to access a confined space such as a pipe, ductwork, or the space above ceiling tiles. A real world view may be captured by a camera transported by a robotic device, sensor data collected from sensors which are co-located with the camera on or in the robotic device, augmented by one or more processors, and provided to a human user at an output device (e.g., a display device) which is separately located from the robotic device.

In FIG. 8, block 802 may be achieved in a variety of ways. In some embodiments, a wireless quality of service (QoS) measurement device is actually connectable (wired or wirelessly) to the display device used for showing augmented images at block 805. The QoS measurement device and the display device can then move together throughout the environment. Alternatively, the display device can simply be supplied data produced by a QoS measurement device. As yet another alternative, the display device is not involved with any processing steps, and the display device is uninvolved in the receiving block 802 and only receives augmented image data after image processing (e.g., blocks 803 and 804) have been performed by one or more other processors.

As a specific illustrative example of the case that an augmented reality display device (referred to as an "AR display" for brevity) is connected with a wireless QoS measurement device, the AR display generates and shows qualities regarding network performance as they are collected. The QoS measurement device collects information about the network (e.g., number of bars, "handoff", etc.). The AR display would then overlay the physical real world view with relevant information from the received measurements. For instance, the AR display highlights the current serving cell tower or connect line(s) between devices and serving towers. The AR display switches indicated (e.g., highlighted) towers upon handoff. If multiple devices are reporting location, performance, and serving tower information, then the AR display gives a view of indicia (e.g., glowing points) representing devices that are in the field of view with lines connecting them to their respective serving towers, where an indicator such as line color represents some aspect of each device-to-tower connection (e.g., active phone call, measured throughout, etc.). Indicia change (e.g., a point flashes) when an event or change such as a handoff occurs. Any of these and other features may be involved in other embodiments disclosed herein and implemented in accordance with the invention.

Figure 9:
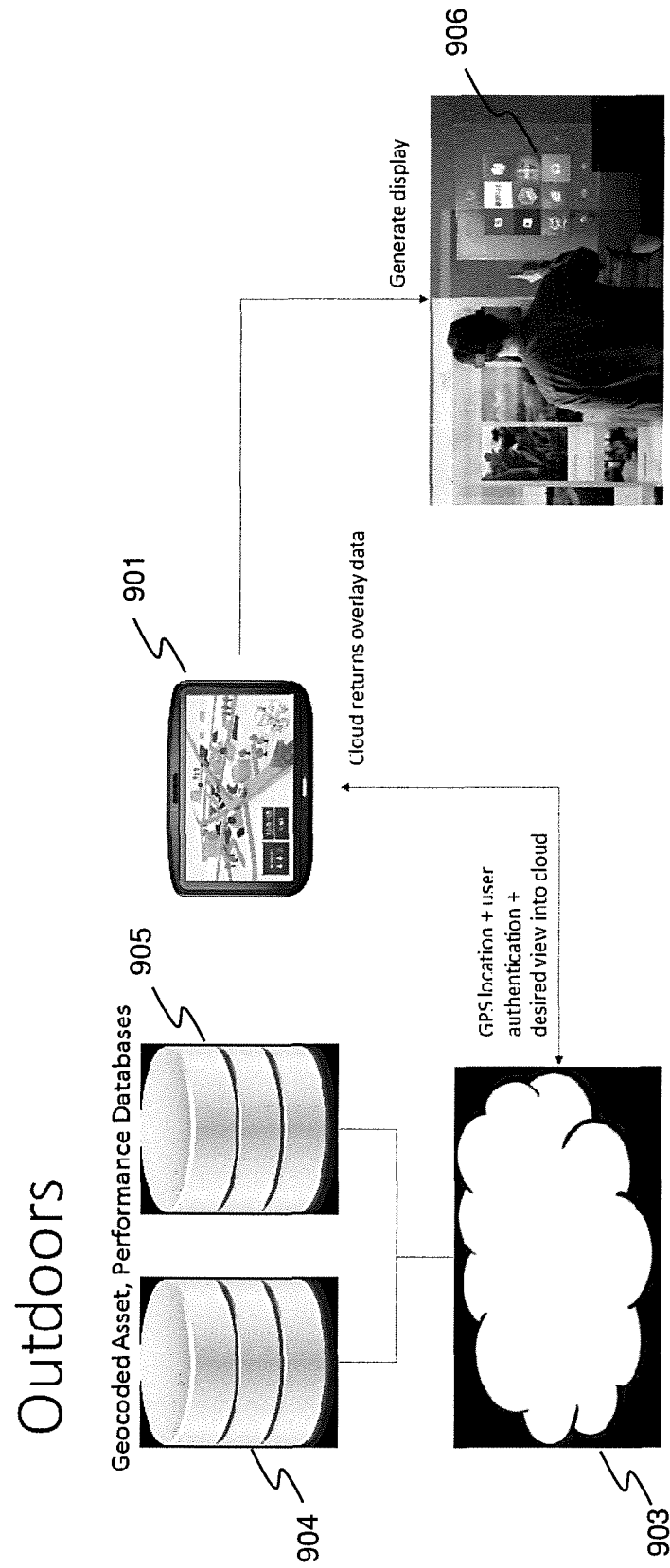
FIG. 9 is a schematic of an example outdoor system.

FIG. 9 schematically illustrates hardware for implementing a method (e.g., method 200 or 800) with the particular application of outdoor use. The electronic device 901 includes the sensors for collecting data and the one or more cameras for capturing the initial real world view of a geographic space. The captured/collected data is sent to the cloud 903 (e.g., processors of one or more geographically remote servers) for data processing (e.g., frustum determination, application of real world frustum to virtual world, virtual object candidate identification, augmentation selection, augmentation modification, etc.). Databases 904 and 905 (which may be one database or many) provide permanent or semi-permanent storage and retrieval for network relevant data, virtual world geometric data, other virtual world data, virtual object data, and essentially every other data discussed herein which is not being newly collected from the sensors and cameras deployed in the field. It should be appreciated that the various data types discussed herein which are generally stored in the databases, in particular network relevant data, may be updated over time when new data (e.g., new measurement data) becomes available or existing data becomes outdated or expired. Virtual objects based on the network relevant data, and augmentations based on those virtual objects, may be correspondingly updated. The processors use the initial image and/or sensor data and the network relevant data to generate data which describes the augmented image. The augmented image data is sent back to device 901 (or other output device as appropriate) which generates the augmented image 906 on its display device.

An "output device", as used herein, is a device capable of providing at least visual, audio, audiovisual, or tactile output to a user such that the user can perceive the output using his senses (e.g., using her eyes and/or ears). In many embodiments, an output device will comprise at least one display, at least one speaker, or some combination of display(s) and speaker(s). A suitable display (i.e., display device) is a screen of a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally only the augmentations that are actively shown or output by the device. Visual augmentations are in any case superimposed on the direct view of the real world environment, without necessarily involving the display of any of the original video input to the system. In fact, for systems which do not use the video input to detect image data, the system may include one or more HMDs that have no camera at all, relying entirely on other sensors (e.g. GPS, gyro, compass as discussed above) to determine the relevant augmentations, and displaying them on otherwise transparent glasses or visors. Output devices and viewing devices may include or be accompanied by input devices (e.g., buttons, touchscreens, menus, keyboards, data ports, etc.) for receiving user inputs.

Figure 10:
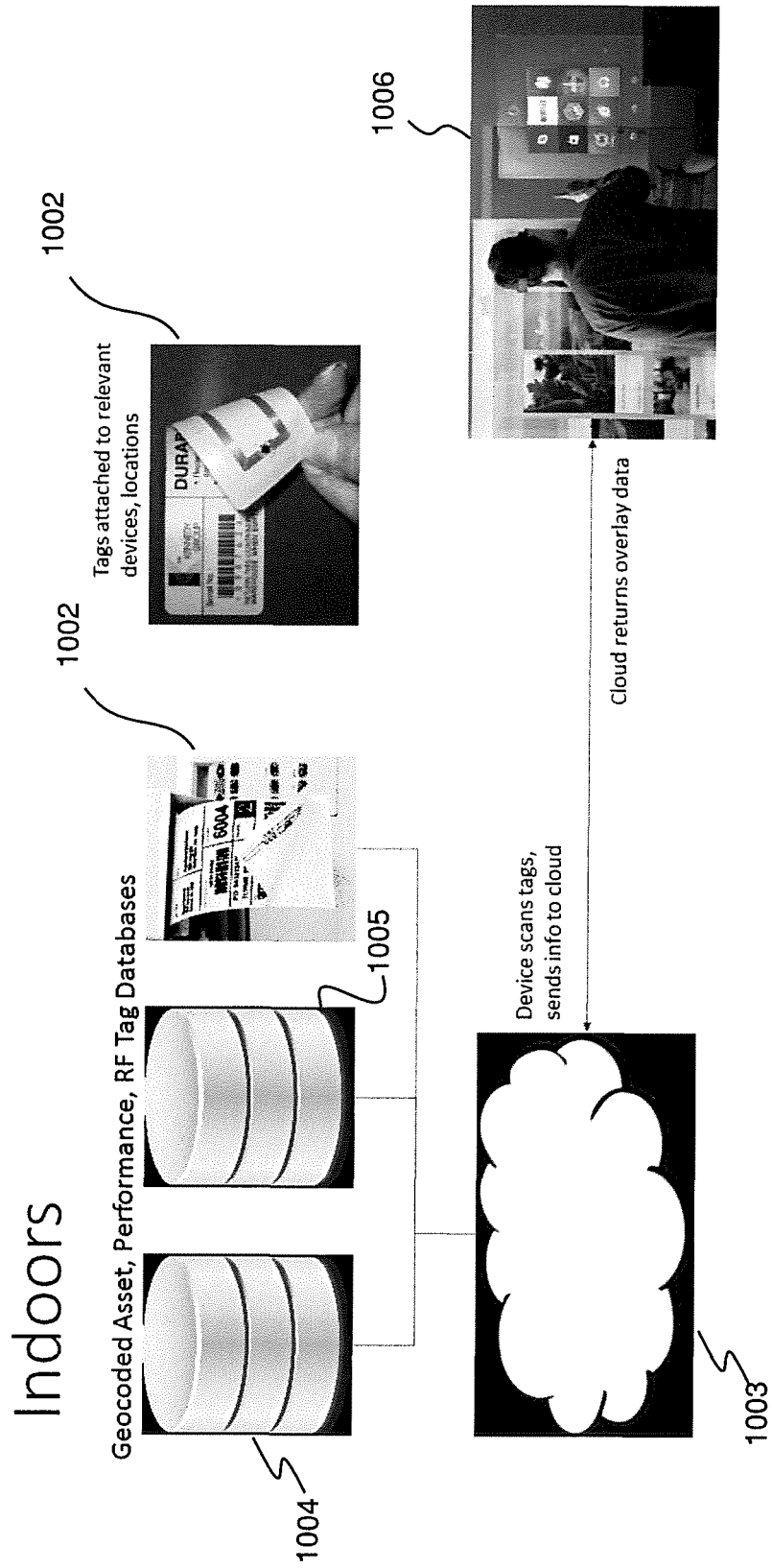
FIG. 10 is a schematic of an example indoor system.

FIG. 10 schematically illustrates hardware for implementing a method (e.g., method 200 or 800) but identifies additional hardware that improves functionality indoors. Outdoor asset data is commonly geocoded with, for example, GPS coordinates. Indoors, GPS can sometimes be insufficient, providing too low a space resolution or being unusable because signals ordinarily exchanged with towers or satellites are blocked by the building's walls, roof, floors, and contents. One example indoor solution is therefore to use tags 1002 (e.g., RF tags) attached to network relevant devices and locations. Databases 1004 and 1005 contain similar if not identical data to databases 904 and 905 in FIG. 9 (and in fact may be the same physical databases). However, the databases 1004 and 1005 further include tag data. The cloud 1003 retrieves or receives this data together with the original image/sensor data from cameras/sensors and combines them to provide the augmented image 1006 displayed or otherwise output on the user's output device. Other alternatives to RF tags are also useable in alternative embodiments. For instance, some embodiments may use video-based sensing of a 3D environment or a RF-based locationing system that does not use tags. For non-GPS systems, a set of reference points are used for registering other positions in the virtual and real worlds. The set of reference points serves the role served by a geodetic datum in the GPS world.

The databases (e.g., 904, 905, 1004, 1005 in FIGS. 9 and 10) may be or comprise computer readable storage media that are tangible devices that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or schematic diagrams of methods, apparatus (systems), and computer program products according to embodiments of the invention. It will be understood that each block of the flowchart illustrations and/or block diagrams, and different combinations of blocks in the flowchart illustrations and/or block diagrams, may be implemented by or with the use of computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. "One or more processors" as frequently used in this disclosure may refer in various embodiments to one or general purpose computers, special purpose computers, or some combination thereof. Computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A computer-implemented method for augmented reality, comprising:
   using a plurality of sensors to collect first data concerning a position and orientation of a viewing device arranged to allow a real world view of a geographic space as viewed by a user situated in the geographic space;
   determining, using one or more processors, a real world frustum based on the first data, wherein the determining provides an image or frame of the real world;
   applying, with the one or more processors, the real world frustum to a virtual world to identify virtual object candidates for augmentation of the real world view, wherein the virtual world includes one or more virtual objects that describe one or more qualities of one or more of network performance and asset configuration that are imperceptible in the real world view, wherein the one or more virtual objects include network relevant data, and wherein the virtual world is characterized by a number of locations which correspond with real locations which appear in the image or frame of the real world;
   selecting, with the one or more processors, one or more augmentations corresponding with one or more of the virtual object candidates including at least one virtual object that describes one or more qualities of one or more of network performance and asset configuration that are imperceptible in the real world view, wherein the one or more augmentations are representations of the network relevant data; and
   providing, with an output device, at least one selected augmentation concurrently with the real world view, the at least one selected augmentation making perceptible one or more qualities of one or more of network performance and asset configuration that are imperceptible in the real world view.

2. The computer-implemented method of claim 1, wherein the step of using a plurality of sensors includes using at least one or more of the following: a gyroscope to collect rotational data, a linear acceleration sensor to collect acceleration data, a magnetic sensor to collect compass data, and a GPS module to collect GPS data.

3. The computer-implemented method of claim 1, wherein the viewing device comprises one or more cameras, and the computer-implemented method further comprises capturing, with the one or more cameras, second data that describes images of the real world view.

4. The computer-implemented method of claim 3, further comprising image processing the second data, and modifying the at least one selected augmentation based on results of the image processing prior to providing the at least one selected augmentation with the output device.

5. The computer-implemented method of claim 4, wherein the image processing step comprises image processing with a convolutional neural network.

6. The computer-implemented method of claim 3, wherein the output device comprises a display, and the computer-implemented method further comprises displaying with the display reproductions of the images of the real world view concurrently with the step of providing at least one selected augmentation.

7. The computer-implemented method of claim 6, wherein the viewing device and the output device are the same device or part of the same device.

8. The computer-implemented method of claim 7, wherein a head-mounted display comprises the viewing device and the output device.

9. The computer-implemented method of claim 1, wherein a see-through head-mounted display comprises the viewing device and the output device.

10. The compute-implemented method of claim 9, wherein the viewing device is a lens or pair of lenses of the see-through head-mounted display.

11. The computer-implemented method of claim 1, further comprising determining whether and which virtual object candidates obscure other virtual object candidates based on the applied frustum, and wherein the selecting step accounts for obscured virtual object candidates when selecting the one or more augmentations.

12. The computer-implemented method of claim 1, wherein augmentations provided by the providing step are visual, audial, audiovisual, haptic, or some combination thereof.

13. The computer-implemented method of claim 12, wherein augmentations provided by the providing step include one or more of the following: 3D representations of real objects, abstractions of real objects, markers, indicators, and cues.

14. The computer-implemented method of claim 12, wherein the output device comprises a display, and wherein augmentations provided by the providing step include visual augmentations superimposed on the real world view.

15. The computer-implemented method of claim 14, wherein the providing step provides at least one indicator as a visual augmentation that differentiates at least one part of the real world view based on the one or more qualities of one or more of network performance and asset configuration that are imperceptible in the real world view.

16. The computer-implemented method of claim 1, further comprising providing for the virtual world virtual objects based on telecommunications assets including but not limited to electrical hardware or associated infrastructure that contributes one or more functions to a telecommunications network.

17. The computer-implemented method of claim 16, wherein at least some of the virtual objects provided in the virtual world are based on one or more of the following: base stations, switches, routers, hubs, computers, test equipment, antennas, connectors, splitters, probes, repeaters, extenders, transceivers, access points, hardware running virtual computing environments, towers, and collections, combinations, or groups of these.

18. The computer-implemented method of claim 1, wherein position information collected among the first data in the step of using a plurality of sensors comprises one or more of absolute position information, relative position information, and associative position information.

19. The computer-implemented method of claim 1, wherein at least some of the virtual objects provided in the virtual world are based on network relevant data that includes one or more of geographic information system (GIS) data, measurement data, project data, asset data, forecast data, and prediction data.

20. The computer-implemented method of claim 1, further comprising providing in the virtual world virtual objects that include network performance data.

21. The computer-implemented method of claim 20, wherein the at least one selected augmentation is a representation of predicted network performance data.

22. The computer-implemented method of claim 20, wherein at least some of the virtual objects provided in the virtual world are based on one or more of the following: received signal strength, best server, throughput, error rates, packet latency, packet jitter, symbol jitter, quality of service, security, coverage area, bandwidth, bit error rate, packet error rate, frame error rate, dropped packet rate, dropped call rate, queuing delay, capacity, signal level, interference level, round trip time, bandwidth delay product, handoff delay time, handoff frequency, signal-to-interface ratio, signal-to-noise ratio, call quality, link budget, Eb/No (average bit energy/noise), Ec/Io (average chip energy/interference plus noise), physical equipment price, and cost information.

23. The computer-implemented method of claim 1, wherein the user situated in the geographic space is a human user, a robotic user, or a camera.

24. An augmented reality system, comprising:
a plurality of sensors configured to collect first data concerning a position and orientation of a viewing device arranged to allow a real world view of a geographic space as viewed by a user situated in the geographic space;
one or more processors configured to execute computer readable program instructions which, when executed, cause the one or more processors to:
determine a real world frustum based on the first data, wherein the determining provides an image or frame of the real world,
apply the real world frustum to a virtual world to identify virtual object candidates for augmentation of the real world view, wherein the virtual world includes one or more virtual objects that describe one or more qualities of one or more of network performance and asset configuration that are imperceptible in the real world view, wherein the one or more virtual objects include network relevant data, and wherein the virtual world is characterized by a number of locations which correspond with real locations which appear in the image or frame of the real world, and
select one or more augmentations corresponding with one or more of the virtual object candidates including at least one virtual object that describes one or more qualities of one or more of network performance and asset configuration that are imperceptible in the real world view, wherein the one or more augmentations are representations of the network relevant data, and
an output device configured to provide at least one selected augmentation concurrently with the real world view, the at least one selected augmentation making perceptible one or more qualities of one or more of network performance and asset configuration that are imperceptible in the real world view.

25. The augmented reality system of claim 24, wherein the plurality of sensors includes at least one or more of the following: a gyroscope to collect rotational data, a linear acceleration sensor to collect acceleration data, a magnetic sensor to collect compass data, and a GPS module to collect GPS data.

26. The augmented reality system of claim 24, further comprising one or more cameras configured for capturing second data that describes images of the real world view.

27. The augmented reality system of claim 26, wherein the output device comprises a display configured for displaying reproductions of the images of the real world view concurrently with providing at least one selected augmentation.

28. The augmented reality system of claim 27, wherein the viewing device and the output device are the same device or part of the same device.

29. A computer program product for providing augmented reality, the computer program product comprising a computer readable storage medium having program instructions embodied therewith, the program instructions executable by one or more processors to cause the one or more processors to perform a method comprising:

collecting from a plurality of sensors first data concerning a position and orientation of a viewing device arranged to allow a real world view of a geographic space as viewed by a user situated in the geographic space;

determining a real world frustum based on the first data, wherein the determining provides an image or frame of the real world;

applying the real world frustum to a virtual world to identify virtual object candidates for augmentation of the real world view, wherein the virtual world includes one or more virtual objects that describe one or more qualities of one or more of network performance and asset configuration that are imperceptible in the real world view, wherein the one or more virtual objects include network relevant data, and wherein the virtual world is characterized by a number of locations which correspond with real locations which appear in the image or frame of the real world;

selecting one or more augmentations corresponding with one or more of the virtual object candidates including at least one virtual object that describes one or more qualities of one or more of network performance and asset configuration that are imperceptible in the real world view, wherein the one or more augmentations are representations of the network relevant data; and providing to an output device augmented image data to output at least one selected augmentation concurrently with the real world view, the at least one selected augmentation making perceptible one or more qualities of one or more of network performance and asset configuration that are imperceptible in the real world view.

* * * * *